United States Patent Office 3,509,081
Patented Apr. 28, 1970

3,509,081
NOVEL ROOM-TEMPERATURE-CURING SILICONE ELASTOMERS AND A METHOD FOR MAKING SAME
Stanley E. Gignac, Jr., Midland, Mich., assignor to Dow Corning Corporation, Midland, Mich., a corporation of Michigan
No Drawing. Filed Nov. 13, 1967, Ser. No. 682,548
Int. Cl. C08h 9/00
U.S. Cl. 260—18                   11 Claims

ABSTRACT OF THE DISCLOSURE

A novel method for producing room-temperature-curing silicone elastomers that involves the incorporation of a reducible dye which subsequently undergoes a color change. The color change occurs at the desired degree of cure and hence, the process serves as a valuable technique aid for dentists, artists, and the like.

Illustrative of the novel silicone elastomers of this invention is a dimethylpolysiloxane in combination with ethylpolysilicate, stannous octoate, and D & C Red No. 17 dye (1-p-phenylazophenylazo-2-naphthol).

---

This invention relates to novel room-temperature-curing silicone elastomers and to a process for their production. More particularly, the invention relates to a method whereby the elastomer undergoes a color change visual to the naked eye which is indicative of the desired degree of cure.

The art is replete with methods for the production of room-temperature-curing silicone elastomers; however, there is no apparent simple and practical method for determining precisely at which point the elastomer has reached a desired degree of cure. The advent of a simple method for determining degree of cure would be advantageous for a number of reasons, e.g., where artists must make reproductions of precious items and have to be certain that contact between the elastomer and the item is kept at an absolute minimum.

Another area in which the novel process is of particular interest is in the dental profession. Dentists are often required to prepare dental impressions and a suitable elastic material is frequently employed for the purpose. Room-temperature-curing silicone elastomers have been found to be an especially suitable material; however, to date, no effective means have been devised wherein one can determine exactly when the impression has become sufficiently "set" or cured after insertion in the oral cavity. At present, the most acceptable method for determining degree of cure is to press a blunt instrument against the material and completeness of "set" is determined if no indentation remains when the instrument is withdrawn. It is obvious that the method is aesthetically undesirable to the patient and is based upon a cumbersome trial and error method so that the dental impression is often removed prior to the desired degree of "set" or cure resulting in a defective and inaccurate reproduction.

It is the principal object of the present invention to provide a means for determining the desired degree of cure of a room-temperature-curing silicone elastomer via a visual color change of the silicone mass.

These and other attendant objects will become readily apparent from a detailed description of the invention which follows.

This invention relates to a method for preparing a room-temperature-curing silicone elastomer comprising:
(A) Mixing—
(1) a hydroxyl end-blocked organopolysiloxane of at least 100 cs. at 25° C., said organopolysiloxane being composed of polymer units of the formula:

in which:
R is a member selected from the group consisting of a monovalent hydrocarbon radical and a halogenated monovalent hydrocarbon radical and
n has an average value of from 1.99 to 2.0 inclusive,
(2) a crosslinker selected from the group consisting of alkylpolysilicates, alkoxy silanes, and organosilicon compounds containing on the average at least three alkoxy radicals per molecule and at least two silicon atoms per molecule, at least some of the silicon atoms having hydrocarbon or halohydrocarbon radicals attached thereto, any remaining valences of the silicon atom being satisfied by substituents selected from the group consisting of oxygen atoms of Si—O—Si bonds, OH groups, and other silicon atoms, and
(3) stannous salts of carboxylic acids,
(B) Incorporating therein a reducible dye which undergoes reduction, whereby a visual color change occurs at the desired degree of cure.

As noted above, the organopolysiloxane (1) can contain attached to the silicon atoms any monovalent hydrocarbon radical and any halogenated monovalent hydrocarbon radical. The organopolysiloxanes (1) in this invention are substantially diorgano-substituted siloxanes which may contain limited amounts of monoorgano-substituted siloxanes. Preferably, the siloxane should have a viscosity of from about 10,000 cs. to about 25,000 cs. at 25° C. and should be essentially free of triorganosiloxane units, although some triorganosilyl containing polysiloxanes can be added to plasticize the elastomer.

Specific examples of R radicals which are operative herein are alkyl radicals such as methyl, ethyl, and octadecyl; cycloaliphatic radicals such as cyclohexyl and cyclopentyl; aromatic hydrocarbon radicals such as phenyl, xenyl, and naphthyl; aralkyl radials such as tolyl and xylyl; and unsaturated hydrocarbon radicals such as vinyl, allyl, and cyclohexenyl. The R radical can also be a halogenated monovalent hydrocarbon radical such as the chloromethyl, bromophenyl, tetrafluorethyl, trifluorovinyl, trifluorotolyl, hexafluoroxylyl, heptachloroxenyl, heptafluoropropyl, chlorodifluorovinyl, and the chlorohexafluorocyclopentyl radical among numerous others.

It is to be understood, of course, that the siloxanes used in this invention can be either homopolymeric or copolymeric materials containing two or more different types of siloxane units and further, that both organic radicals attached to any one silicon atom can be the same or the radicals attached to any one silicon atom can be different.

The crosslinker (2) can be an alkylpolysilicate such as methylpolysilicate, ethylpolysilicate, isopropylpolysilicate, secondary amylpolysilicate, n-butylpolysilicate and mixtures thereof; the crosslinker can also be an alkoxy silane such as

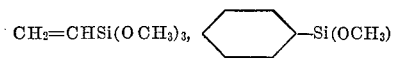

$CH_2=CHCH_2Si(OC_2H_5)_3$, methyl trimethoxy silane, methyl dimethoxy ethoxy silane, methyl dipropoxy methoxy silane, methyl diethoxy methoxy silane, tetramethoxy silane, tetraethoxy silane, tetrapropoxy silane, and tetrabutoxy silane; and the crosslinker can also be an organosilicon compound as described above in which the organic radical can be any radical as exemplified by the definition of R contained herein such as:

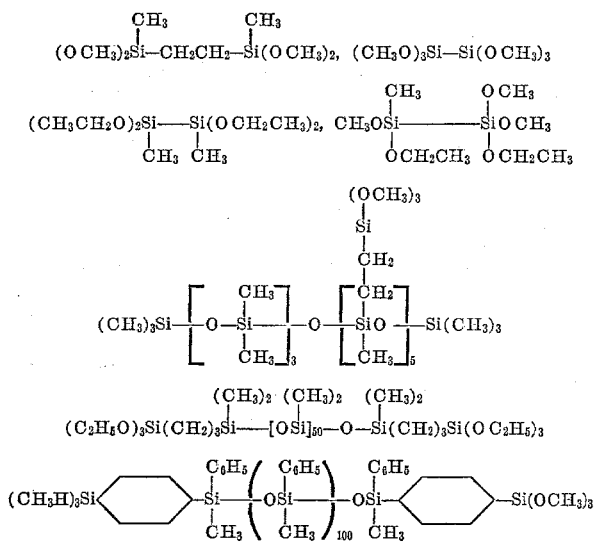

among others.

Examples of the stannous salts of carboxylic acids (3) which are operative in this invention include stannous octoate, stannous stearate, stannous palimitate, stannous oleate, stannous ricinoleate, stannous butyrate, stannous naphthenate, stannous resinate, stanous lioleate, stannous acetate, stannous laurate, stannous tallate, stannous benzoate, stannous phthalate, stannous hexoate, stannous-2-ethyl-hexoate, and stannous succinate among many others. Any of the above catalysts are effective; however, stabilized stannous oleate or stannous octoate is normally preferred.

The room-temperature-curing silicone elastomers defined above are well known and are commercially available materials. The art is replete with examples and methods for their manufacture, i.e., U.S. Patents 2,927,907; 3,050,485; and 3,070,555 which are hereby incorporated by reference. For this reason further enumeration regarding such elastomers is deemed unnecessary for purposes of the present invention.

The dyes, as noted above, must be reducible and hence, are subject to a transformation in color. Reducible dyes which are well known dyes and which are operative herein include azo dyes and other dyes such as D & C Red No. 17 (1 - p - phenylazophenylazo - 2 - naphthol); Methyl orange, which is prepared by coupling diazotized sulphanilic acid with dimethylamine; alpha-Naphthol orange, which is prepared by coupling diazotized sulphanilic acid with alpha-naphthol; Metanil yellow, which is made from diazotized metanilic acid and diphenylamine; Fast Red A, which is made from diazotized naphthionic acid and beta-naphthol; Victoria violet, which is made from p-phenylenediamine and chromatiope acid; and Methylene blue, among countless others. Examples of such dyes and methods for their preparation are disclosed in the text "Organic Chemistry" 4th Edition (1950) by Paul Karrer.

It is of importance to note that it is believed that there is no technical relationship between the desired cure and the ultimate color change. Apparently, the cure does not initiate the color change but rather, the dye is reduced and the color change occurs during or over a period of time which is directly related to the desired degree of cure.

This invention also relates to a cured elastomeric composition of matter obtained from a mixture of ingredients consisting essentially of:

(1) 100 parts of a hydroxyl end-blocked organopolysiloxane of at least 100 cs. at 25° C., said organopolysiloxane being composed of polymer units of the formula:

$$R_nSiO_{\frac{4-n}{2}}$$

in which

R is selected from the group consisting of monovalent hydrocarbon radicals and halogenated monovalent hydrocarbon radicals, and n has an average value of from 1.99 to 2.0 inclusive, (2) from 3.0 to 10 parts of a crosslinker selected from the group consisting of alkylpolysilicates, alkoxy silanes, and organosilicon compounds containing on the average at least three alkoxy radicals per molecule and at least two silicon atoms per molecule, at least some of the silicon atoms having hydrocarbon or halohydrocarbon radicals attached thereto, any remaining valences of the silicon atom being satisfied by substituents selected from the group consisting of oxygen atoms of Si—O—Si bonds, OH groups, and other silicon atoms, and (3) from 0.1 part to 10 parts of a stannous salt of carboxylic acid, and (4) from 0.0002 to 0.0050 part of a reducible dye.

If desired, fillers can be incorporated in the elastomers of this invention. Suitable fillers include organic materials such as cork, wood flour, cotton linters, and organic fabrics or inorganic fillers such as calcium carbonate, titania, and silica powders.

In practicing the invention described herein, one merely mixes the organopolysiloxane (1) with the cross-linker (2) which contains the reducible dye until a consistent color effect is achieved throughout the mass of material. The catalyst is then conventionally added to the above admixture and after approximately five to fifteen minutes the material is cured and the cure is accompanied by a change in color. The above practice can, of course, be obviously modified within the scope of this invention. For example, the organopolysiloxane (1) can also contain a commercially available dye, i.e., a yellow dye so that when it is well mixed with the crosslinker (2) containing the reducible dye, i.e., a reducible red dye, the mixed mass will assume a sharp color, i.e., orange. The catalyst can also contain a commercially available dye, i.e., a blue dye so that when it is added to the above admixture, the mass changes from orange to gray which subsequently changes to a greenish color at the desired degree of cure. In the latter modification, it is to be noted that in addition to the color change occurring at the desired degree of cure, other color changes are apparent during the blending process indicating that the materials are well mixed.

The following examples are illustrative only and should not be construed as limiting the invention which is properly delineated in the appended claims. In all of the examples the parts are parts by weight.

EXAMPLE 1

100 parts of a hydroxyl end-blocked dimethylpolysiloxane fluid having a viscosity of 15,000 cs. at 25° C. containing a diatomaceous earth filler and a trace amount of a commercially available yellow dye was mixed with 6.0 parts of a crosslinker of the formula:

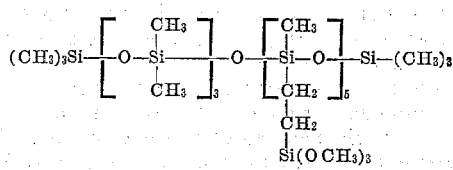

which contained 0.00168 part of a reducible red dye (D & C Red No. 17). The mixture was stirred until a consistent orange color appeared throughout the mass of material. To the above was added 2.5 parts of stabilized stannous oleate containing a trace amount of a commercially available blue dye. The material assumed a gray color which subsequently became greenish in color upon cure (approximately 8 to 10 minutes).

EXAMPLE 2

The procedures of Example 1 were repeated with the exception that 8.0 parts n-propylorthosilicate containing 0.0040 part of a reducible red dye (D & C Red No. 17) and 1.5 parts of stabilized stannous octoate were substituted for the corresponding materials of Example 1. Equivalent results were obtained.

EXAMPLE 3

The procedures of Example 1 were repeated with the exception that 7.0 parts of ethylpolysilicate containing 0.00175 part of a reducible red dye (D & C Red No. 17) and 1.5 parts of stabilized stannous octoate were substituted for the corresponding materials of Example 1. Equivalent results were obtained.

EXAMPLE 4

When the following formulations were tested in accordance with Example 1 using the reducible dye of that Example, equivalent results were obtained.

(A) 100 parts of a hydroxyl end-blocked dimethylpolysiloxane fluid having a viscosity of 100 cs. at 25° C.; 3.0 parts isopropylpolysilicate containing 0.00020 part of a reducible dye; and 10.0 parts stannous - 2 - ethylhexoate.

(B) 100 parts of a 2,000 cs. viscosity polysiloxane having the composition 7.5 mol percent phenylmethylpolysiloxane and 92.5 mol percent dimethylpolysiloxane, said polymer being free of triorganosilyl end groups; 10 parts tetramethoxy silane containing 0.005 part of a reducible dye; and 0.1 part stannous benzoate.

(C) 100 parts of a 100,000 cs. viscosity ethylmethylpolysiloxane; 6.0 parts n-orthobutylsilicate containing 0.0012 part of a reducible dye; and 2.5 parts stabilized stannous octoate.

(D) 100 parts of a 100,000 cs. organopolysiloxane having the composition 90 mol percent dimethylpolysiloxane and 10 mol percent

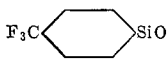

7.5 parts methylpolysilicate containing 0.0015 part of a reducible dye; and 5.0 parts stabilized stannous oleate.

(E) 100 parts of a 50,000 cs. methylvinylpolysiloxane; 5.0 parts n-amylorthosilicate containing 0.0012 part of a reducible dye; and 3.0 parts stannous hexoate.

(F) 100 parts of a polysiloxane consisting of

units having a viscosity of 12,500 cs. at 25° C.; 3.0 parts of a crosslinker of the formula $$CH_2=CHCH_2Si(OC_2H_5)_3$$

containing 0.0025 part of a reducible dye; and 1.0 part stannous hexoate.

EXAMPLE 5

When the following reducible dyes were substituted for the corresponding dye of Example 1, equivalent results were obtained.

(a) Methyl orange
(b) Metanil yellow
(c) Victoria violet
(d) Fast Red A
(e) Methylene blue That which is claimed is:

1. A process for preparing a room-temperature-curing silicone elastomer comprising:
    (A) Mixing—
        (1) a hydroxyl end-blocked organopolysiloxane of at least 100 cs. at 25° C., said organopolysiloxane being composed of polymer units of the formula:

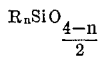

in which:
    R is a member selected from the group consisting of a monovalent hydrocarbon radical and a halogenated monovalent hydrocarbon radical and
    n has an average value of from 1.99 to 2.0 inclusive.
(2) a crosslinker selected from the group consisting of alkylpolysilicates, alkoxy silanes, and organosilicon compounds containing on the average at least three alkoxy radicals per molecule, and at least two silicon atoms per molecule, at least some of the silicon atoms having hydrocarbon or halohydrocarbon radicals attached thereto, any remaining valences of the silicon atom being satisfied by substituents selected from the group consisting of oxygen atoms of Si—O—Si bonds, OH groups, and other silicon atoms, and
(3) stannous salts of carboxylic acids,
(B) incorporating therein a reducible azo-dye which undergoes reduction, whereby a visual color change occurs at the desired degree of cure.

2. The process as recited in claim 1 wherein R is a methyl radical and the organopolysiloxane has a viscosity of about 15,000 cs. at 25° C.

3. The process as recited in claim 2 wherein the crosslinker (2) is an organosilicon compound containing on the average at least three alkoxy radicals per molecule and at least two silicon atoms per molecule, at least some of the silicon atoms having hydrocarbon or halohydrocarbon radicals attached thereto, any remaining valences of the silicon atom being satisfied by substituents selected from the group consisting of oxygen atoms of Si—O—Si bonds, OH groups, and other silicon atoms.

4. The process as recited in claim 3 wherein the organosilicon compound is a trimethyl end-blocked organopolysiloxane consisting of dimethylsiloxy units and units of the formula

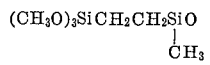

5. The process as recited in claim 4 wherein the stannous salt of a carboxylic acid (3) is stannous octoate.

6. The process as recited in claim 5 wherein the reducible azo-dye is 1-p-phenylazophenylazo-2-naphthal.

7. The process as recited in claim 1 wherein the stannous salt of a carboxylic acid (3) is stannous oleate and the reducible azo-dye is Methylene blue.

8. A cured elastomeric composition of matter obtained from a mixture of ingredients consisting essentially of:

(1) 100 parts of a hydroxyl end-blocked organopolysiloxane of at least 100 cs. at 25° C. said organopolysiloxane being composed of polymer units of the formula:

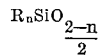

in which:
    R is selected from the group consisting of monovalent hydrocarbon radicals and halogenated monovalent hydrocarbon radicals, and
    n has an average value of from 1.99 to 2.0 inclusive,
(2) from 3.0 to 10 parts of a crosslinker selected from the group consisting of alkylpolysilicates, alkoxy silanes, and organosilicon compounds containing on the average at least three alkoxy radicals per molecule and at least two silicon atoms per molecule, at least some of the silicon atoms having hydrocarbon or halohydrocarbon radicals attached thereto, any remaining valences of lected from the group consisting of oxygen atoms of Si—O—Si bonds, OH groups, and other silicon atoms, and (3) from 0.1 part to 10 parts of a stannous salt of carboxylic acid, and (4) from 0.0002 to 0.0050 part of a reducible azo-dye.

9. The composition as recited in claim 8 wherein R is a methyl radical and the organopolysiloxane has a viscosity of 15,000 cs. at 25° C.

10. The composition as recited in claim 9 wherein there are 6.0 parts of a trimethyl end-blocked organopolysiloxane consisting of dimethylsiloxy units and units of the formula

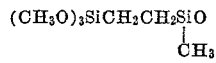

2.5 parts of stannous oleate, and 0.0012 part of 1-p-phenylazophenylazo-2-naphthal.

11. The cured elastomeric composition as recited in claim 8 further characterized in that it is a dental impression.

References Cited
UNITED STATES PATENTS

| | | | |
|---|---|---|---|
| 3,065,194 | 11/1962 | Nitzsche et al. | 260—37 |
| 3,082,527 | 3/1963 | Nitzsche et al. | 32—17 |
| 3,127,363 | 3/1964 | Nitzsche et al. | 260—18 |
| 3,287,291 | 11/1966 | Ender | 260—18 |

DONALD E. CZAJA, Primary Examiner

M. I. MARQUIS, Assistant Examiner

U.S. Cl. X.R.

32—17; 260—37, 46.5